(12) United States Patent
Wason, Jr. et al.

(10) Patent No.: US 9,052,383 B2
(45) Date of Patent: Jun. 9, 2015

(54) SYSTEM FOR TESTING AN ACOUSTIC ARRAY UNDER WATER LOAD

(75) Inventors: Charles P. Wason, Jr., Amherst, NH (US); Eric P. Sears, Bedford, NH (US); William R. Leslie, Madbury, NH (US); Kushal Talukdar, Wayland, MA (US); Michael C. Brenker, Nashua, NH (US); Michael J. Krueger, Bedford, NH (US); Luis Colom, Fremont, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 461 days.

(21) Appl. No.: 13/587,080

(22) Filed: Aug. 16, 2012

(65) Prior Publication Data
US 2013/0044564 A1    Feb. 21, 2013

Related U.S. Application Data

(60) Provisional application No. 61/524,115, filed on Aug. 16, 2011.

(51) Int. Cl.
*H04B 17/00* (2006.01)
*G01S 7/52* (2006.01)

(52) U.S. Cl.
CPC .................. *G01S 7/52006* (2013.01)

(58) Field of Classification Search
CPC .. G01S 7/52006; G01S 7/52004; G01V 13/00
USPC .......................................................... 367/13
See application file for complete search history.

(56) References Cited

U.S. PATENT DOCUMENTS

| 3,466,924 A * | 9/1969 | Roshon et al. ................. 73/1.83 |
| 2008/0031090 A1* | 2/2008 | Prus et al. ........................ 367/13 |
| 2013/0044564 A1* | 2/2013 | Wason et al. .................... 367/13 |

* cited by examiner

*Primary Examiner* — Daniel Pihulic
(74) *Attorney, Agent, or Firm* — Daniel J. Long

(57) ABSTRACT

An acoustic projector testing system using an acoustically transparent portable vessel which encloses a test apparatus is disclosed. The vessel is connected to an adapter plate which allows the test apparatus to be submerged in water. The testing system is then submerged in shallow water. An external pump fills the vessel with water and the air inside the vessel is allowed to escape through an external, sealable vent, Once all the air is evacuated, the vent is sealed. The pressure inside the vessel can be altered by adjusting the amount of water pumped into the vessel to perform necessary testing.

27 Claims, 4 Drawing Sheets

SYSTEM FOR TESTING AN ACOUSTIC ARRAY UNDER WATER LOAD

CROSS-REFERENCE TO RELATED APPLICATIONS

This application claims rights under 35 USC §119(e) from U.S. Application Ser. No. 61/624,115 filed Aug. 16, 2011, the contents of which are incorporated herein by reference.

TECHNICAL HELD

Embodiments are generally related to acoustics systems. Embodiments are also related to acoustic testing systems. Embodiments are additionally related to a system and method for testing an acoustic array under water load.

BACKGROUND OF THE INVENTION

Acoustic projectors are commonly used as a part of SOund Navigation And Ranging (SONAR) system. Pulses of sound from acoustic projectors are used to probe the sea, and the echoes are then processed to extract information about the sea, its boundaries and submerged objects. In order to properly test such acoustic projectors it is critical to evaluate their performance under water. While equipment testing on an actual host platform at operational depths provides the most accurate test data, the inability to make changes to the equipment, prohibitive costs, and huge labor investments associated with this style of testing make it impracticable. To circumvent these limitations, traditional testing methods include either shallow water testing, or testing in an acoustic pressure tank.

Traditional shallow water testing involves submerging the acoustic projectors to a shallow depth, typically less than 50 feet, and testing them at various levels of power transmission. Unfortunately, operating acoustic projectors at full power in these shallow depths causes cavitation at some frequencies and can therefore cause damage to the unit under test.

As a result, acoustic pressure tank facilities are typically necessary for performing acoustic measurements at full power transmit. These facilities allow testing at varying simulated depths and usually provide robust testing equipment. However, acoustic pressure tanks require large, heavy structures as well as expensive facilities. Accordingly, there are few of these tanks available. Most are owned by the government, are difficult to schedule, expensive to rent, and require transport of equipment and travel to the facility.

A need therefore exists for a relatively low cost acoustic projector testing system capable of simulating a variety of depths and suitable for testing at full power transmission.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide acoustics systems.

It is another aspect of the disclosed embodiments to provide acoustic testing systems.

It is yet another aspect of the disclosed embodiments to provide a system and method for testing an acoustic array under water load.

The aforementioned aspects and other objectives and advantages can now be achieved as described herein. An acoustic projector testing system uses an acoustically transparent portable vessel to enclose a unit under test for example acoustic projector. The unit under test is connected to an adapter plate which allows the unit under test to be submerged in water. The testing system is then submerged in shallow water. An external pump fills the vessel with water and the air inside the vessel is allowed to escape through an external, sealable vent. Once all the air is evacuated, the vent is sealed. The pressure inside the vessel can be altered by adjusting the amount of water pumped into the vessel.

This modular testing system can simulate a variety of depths in the area surrounding the unit under test while still being low cost, portable, and functional in shallow water. Although the performance is similar to that of an acoustic pressure tank, the modular system takes advantage of the pre-existing water pressure at shallow depths to support the vessel, thereby reducing the cost and increasing the portability of the structure of the testing apparatus.

The present invention provides a relatively low cost acoustic projector testing system that is capable of simulating a variety of depths and suitable for testing at full power transmission.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

Figure 1:
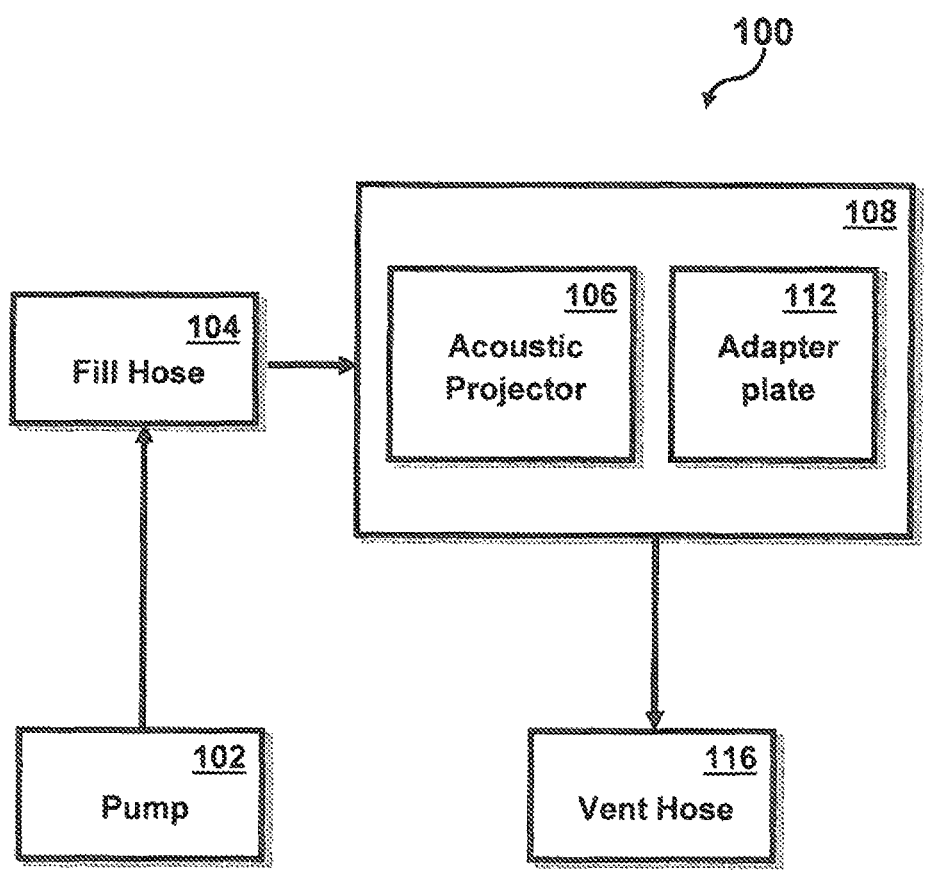
FIG. 1 illustrates a block diagram of an acoustic projector testing system, in accordance with the disclosed embodiments.

Referring to FIG. 1 a block diagram of an acoustic projector testing system 100 is depicted. A unit under test for example an acoustic projector 106 is enclosed in an acoustically transparent portable vessel 108. An adapter plate 112 is attached to the acoustic projector 106. An external pump 102 can be utilized to fill the vessel 108 with water through a fill hose 104 and the air in the vessel 108 can be allowed to escape through an external, sealable vent hose 116.

Figure 2:
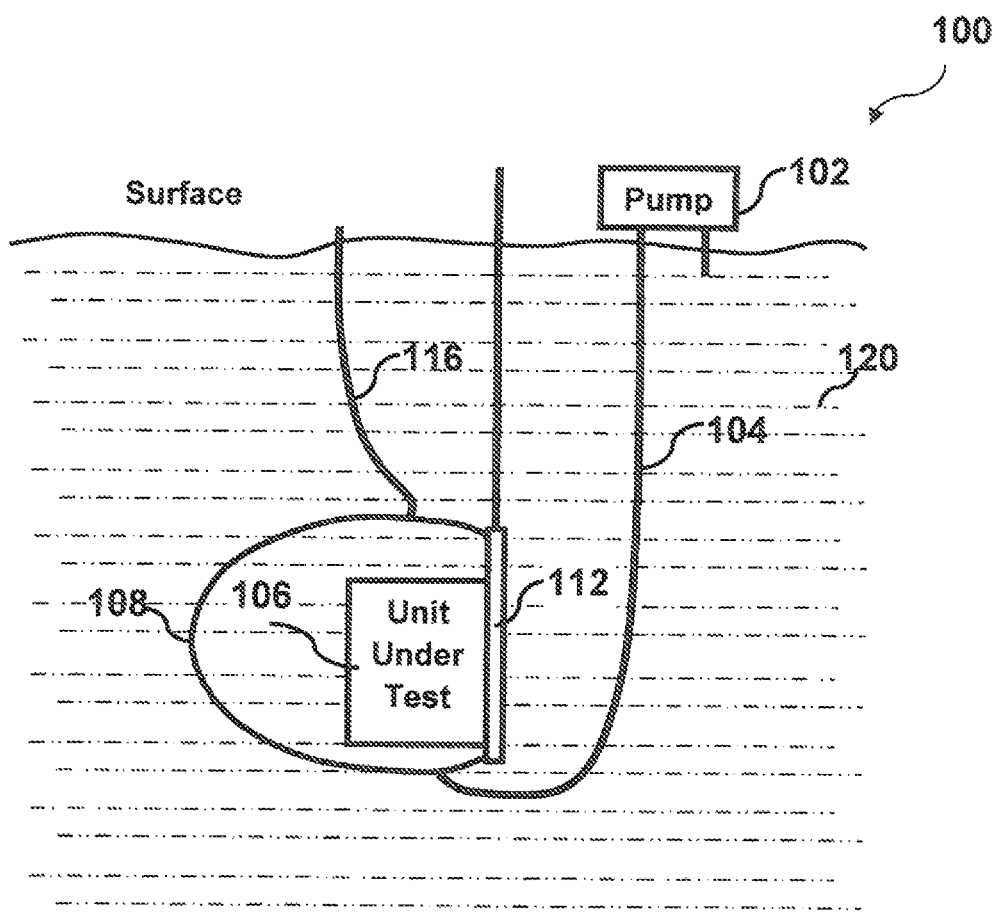
FIG. 2 illustrates a schematic diagram of the acoustic projector testing system depicted in FIG. 1, in accordance with the disclosed embodiments.

FIG. 2 illustrates a schematic diagram of the acoustic projector testing system 100 depicted in FIG. 1. The unit under test for example the acoustic projector 106 is attached to the adapter plate 112, which allows the acoustic projector 106 to be submerged in water 120. The pump 102 fills the surrounding acoustically transparent portable vessel 108 by injecting water 120 through the fill hose 104. The vent hose 116 then allows the air in the vessel 108 to escape. Once the vessel 108 is filled with water, the vent hose 116 can be closed to seal the vessel 108. Additional pumping can then be used to increase pressure in the vessel 108. Note that system can also relay data to the surface by utilizing suitable relay systems. Also note that the vessel can be an array water load comprising pressurized transparent bag/container.

Figure 3:
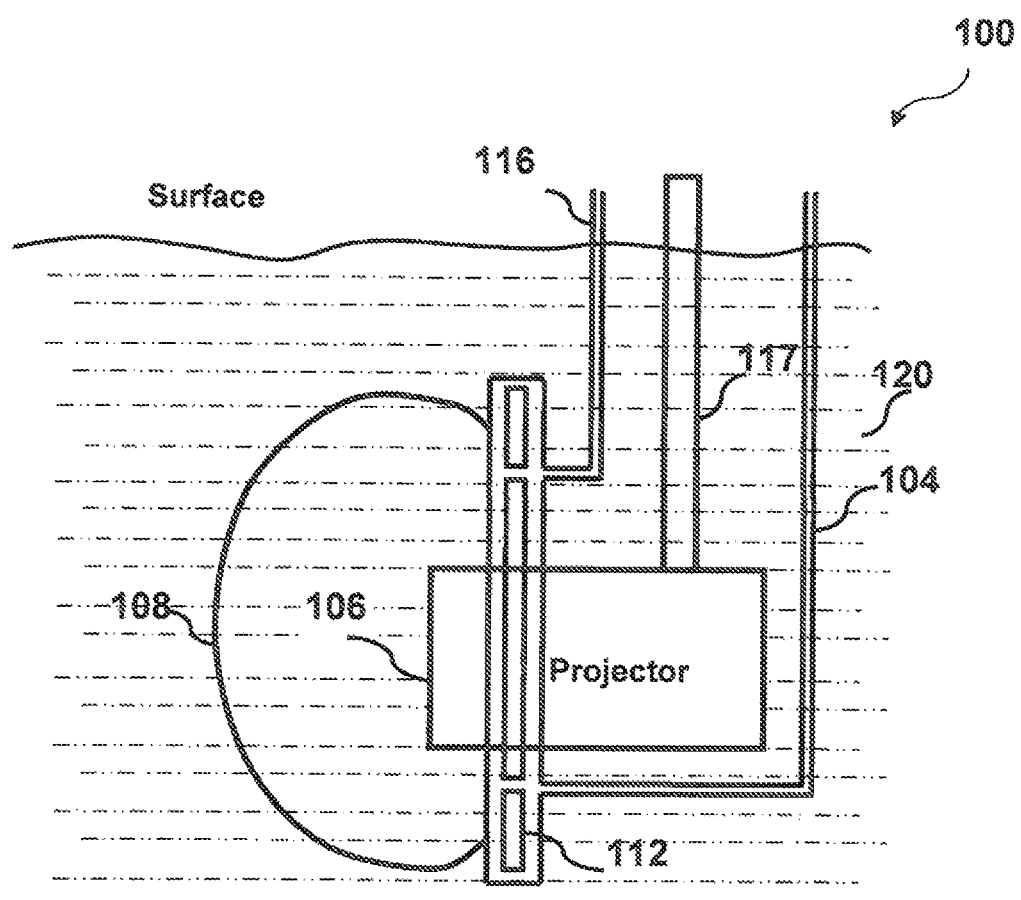
FIG. 3 illustrates a schematic diagram of the acoustic projector testing system depicted in FIG. 1, in accordance with the alternate embodiments

FIG. 3 illustrates a schematic diagram of the acoustic projector testing system depicted in FIG. 1, in accordance with the alternate embodiments. The acoustic projector 106 is mounted to a mounting pole 117. The acoustic projector 106 is attached to the adapter plate 112, such a way that the acoustically transparent vessel 108 is placed over the radiating surface of acoustic projector 106. The water 120 is filled in the surrounding acoustically transparent portable vessel 108 through the fill hose 104. The vent hose 116 then allows the air in the vessel 108 to escape. Once the vessel 108 is filled with water, the vent hose 116 can be closed to seal the vessel 108.

Figure 4:
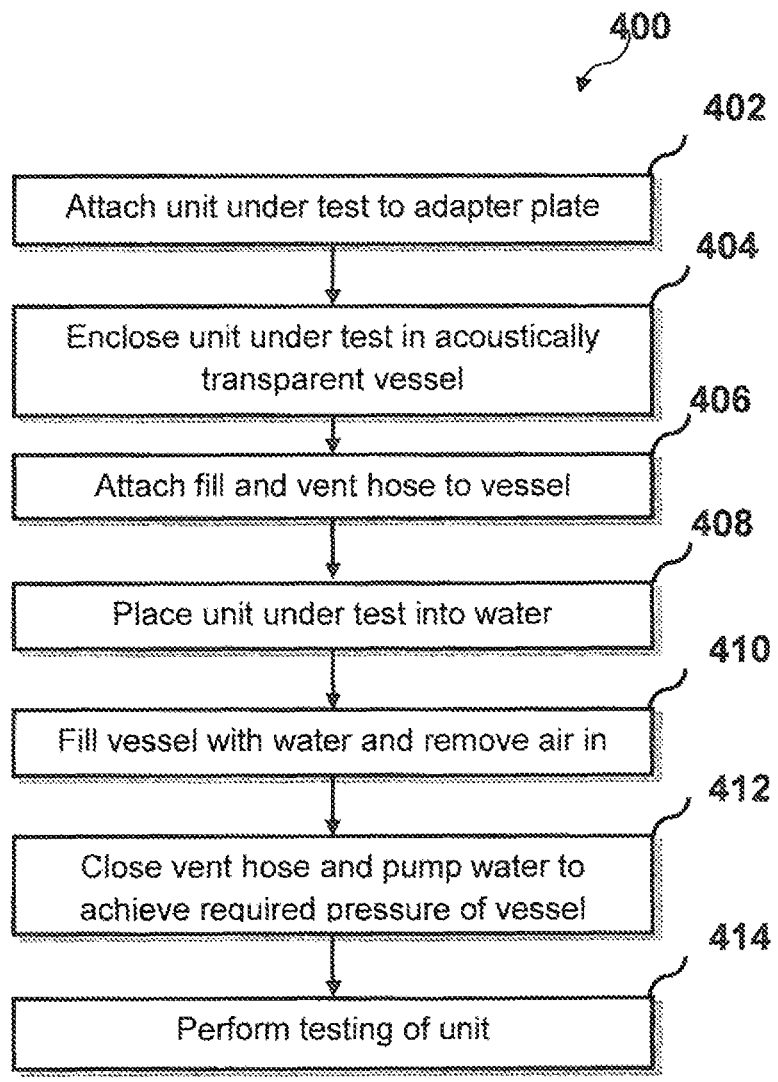
FIG. 4 illustrates a flow chart depicting the process of testing an acoustic projector, in accordance with the disclosed embodiments.

FIG. 4 illustrates a flow chart 400 depicting the process of testing an acoustic projector by utilizing the projector testing system 100 depicted in FIG. 1. As said at block 402, the unit under test is attached to the adapter plate. Then the unit under test is enclosed in the acoustically transparent vessel as depicted at block 404. The fill hose and vent hose are attached to the vessel and the unit under test is placed into the water as illustrated at block 406 and 408. The vessel is filled with water by utilizing a fill hose and air in the vessel is removed by pumping water through the fill hose as said at block 410. Then, the required vessel pressure for testing the unit is achieved by closing the vent hose and pumping water to the vessel as depicted at block 412. Finally, the unit is tested as said at block 414. The present invention provides a relatively low cost acoustic projector testing system capable of simulating a variety of depths and suitable for testing at full power transmission.

The present invention takes advantage of the pre-existing water pressure at shallow depths to support the pressurized vessel. The additional supportive loading allows the vessel to simulate various depths without the large, expensive, bulky equipment often associated with acoustic pressure tanks. A flexible "bag-like" vessel is preferable for an exemplary embodiment, but a rigid structure is also contemplated. Thus, this modular testing system can simulate a variety of depths in the area surrounding the unit under test while still being relatively low cost, portable, and functional in shallow water.

While the present invention has been described in connection with a preferred embodiment, it is to be understood that other similar embodiments may be used or modifications and additions may be made to the described embodiment for performing the same function of the present invention without deviating therefrom. Therefore, the present invention should not be limited to any single embodiment.

What is claimed is:

1. An acoustic projector testing system comprising:
   a test apparatus;
   an acoustically transparent vessel enclosing said test apparatus;
   a mounting pole;
   an adapter plate;
   a pump operatively connected to a fill hose, wherein said fill hose is positioned to supply water to said acoustically transparent vessel; and
   a vent hose positioned to evacuate gaseous contents of said acoustically transparent vessel.

2. The system of claim 1, wherein said test apparatus is mounted on a mounting pole.

3. The system of claim 1, wherein said test apparatus is connected to the adapter plate.

4. The system of claim 1, wherein said acoustically transparent vessel is placed over radiating surface of said test apparatus.

5. The system of claim 3, wherein said adapter plate allows said test apparatus to be submerged in water.

6. The system of claim 3, wherein said adapter plate allows relay data to water surface.

7. The system of claim 1, wherein said test apparatus is submerged in shallow water for conducting necessary test.

8. The system of claim 1, wherein said pump fills water in said vessel to escape air in said acoustically transparent vessel.

9. The system of claim 1, wherein said vent hose is sealed and pressure in said acoustically transparent vessel can be altered by adjusting amount of water pumped into said acoustically transparent vessel.

10. The system of claim 1, wherein said acoustically transparent vessel is a flexible bag.

11. The system of claim 1, wherein said acoustically transparent vessel is a rigid vessel.

12. The system of claim 1, wherein said test apparatus is an acoustic projector.

13. A method for testing an acoustic projector comprising:
    enclosing a test apparatus in an acoustically transparent vessel;
    filling said acoustically transparent vessel with water, wherein the acoustically transparent vessel is filed with water by means of a pump connected to a fill hose attached to the acoustically transparent vessel;
    pressurizing said acoustically transparent vessel; and
    evacuating gaseous contents of said acoustically transparent vessel by means of a vent hose.

14. The method of claim 13, wherein said test apparatus is mounted on a mounting pole.

15. The method of claim 13, wherein said test apparatus is connected to an adapter plate.

16. The method of claim 15, wherein said adapter plate allows said test apparatus to be submerged in water.

17. The method of claim 15, wherein said adapter plate allows relay data to water surface.

18. The method of claim 13, wherein said acoustically transparent vessel is filled with water by utilizing a fill hose.

19. The method of claim 13, wherein air in said acoustically transparent vessel is allowed to escape by utilizing a vent hose.

20. The method of claim 13, wherein said acoustically transparent vessel is placed over radiating surface of said test apparatus.

21. The method of claim 13 wherein said test apparatus is submerged in shallow water for conducting necessary test.

22. The method of claim 13, wherein said pump fills water in said vessel to escape air in said acoustically transparent vessel.

23. The method of claim 13, wherein said vent hose is sealed and pressure in said acoustically transparent vessel can be altered by adjusting amount of water pumped into said acoustically transparent vessel.

24. The method of claim 13, wherein said acoustically transparent vessel is a flexible bag.

25. The method of claim 13, wherein said acoustically transparent vessel is a rigid vessel.

26. The method of claim 13, wherein said test apparatus is an acoustic projector.

27. A method for testing an acoustic projector comprising:
enclosing a test apparatus in an acoustically transparent vessel;
filling said acoustically transparent vessel with water wherein the acoustically transparent vessel is filed with water by means of a pump connected to a fill hose attached to the acoustically transparent vessel;
pressurizing said acoustically transparent vessel, wherein said test apparatus is connected to an adapter plate, and said adapter plate allows said test apparatus to be submerged in water having a surface and permits relay data to be transmitted to the water surface; and
evacuating gaseous contents of said acoustically transparent vessel by means of a vent hose.

* * * * *